United States Patent
Nishikawa et al.

(10) Patent No.: US 7,385,774 B2
(45) Date of Patent: Jun. 10, 2008

(54) MASTER INFORMATION CARRIER FOR MAGNETIC TRANSFER, MAGNETIC TRANSFER METHOD, AND MAGNETIC RECORDING MEDIUM

(75) Inventors: Masakazu Nishikawa, Odawara (JP); Makoto Nagao, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 124 days.

(21) Appl. No.: 11/087,649

(22) Filed: Mar. 24, 2005

(65) Prior Publication Data

US 2005/0213236 A1 Sep. 29, 2005

(30) Foreign Application Priority Data

Mar. 24, 2004 (JP) .............................. 2004/086620

(51) Int. Cl.
  *G11B 5/86* (2006.01)
(52) U.S. Cl. ....................................................... 360/17
(58) Field of Classification Search .................... None
  See application file for complete search history.

(56) References Cited

U.S. PATENT DOCUMENTS

| | | | |
|---|---|---|---|
| 5,748,421 A | 5/1998 | Taki et al. | |
| 6,262,859 B1 | 7/2001 | Cho | |
| 6,590,729 B1 | 7/2003 | Akagi et al. | |
| 7,218,466 B1 * | 5/2007 | Deeman et al. | ................ 360/17 |

| | | | |
|---|---|---|---|
| 2002/0044368 A1 | 4/2002 | Yoshizawa | |
| 2002/0051315 A1 | 5/2002 | Mundt et al. | |
| 2003/0123170 A1 | 7/2003 | Miyata et al. | |
| 2004/0001266 A1 | 1/2004 | Kuo et al. | |
| 2004/0190180 A1 * | 9/2004 | Hattori et al. | ................ 360/69 |

FOREIGN PATENT DOCUMENTS

| | | |
|---|---|---|
| EP | 0 915 456 | 5/1999 |
| EP | 1 398 765 | 3/2004 |
| JP | 10-40544 A | 2/1998 |
| JP | 10-269566 A | 10/1998 |
| JP | 2000-293839 | 10/2000 |
| JP | 2001-291234 | 10/2001 |
| JP | 2002-42301 A | 2/2002 |

OTHER PUBLICATIONS

European Search Report for EP 05 00 6533 dated Nov. 18, 2005.

* cited by examiner

*Primary Examiner*—Thang V. Tran
*Assistant Examiner*—Daniell L. Negrón
(74) *Attorney, Agent, or Firm*—Sughrue Mion, PLLC (57) ABSTRACT

A master information carrier for magnetic transfer bears uneven signal patterns on its surface. When the minimum bit length in the uneven signal patterns is $B_{min}$, dummy uneven patterns are provided in a depression of the uneven signal patterns, which has a length of $4B_{min}$ or longer in the direction along a track. When magnetic transfer is performed, magnetized patterns corresponding to the dummy uneven patterns are transferred onto a slave medium. The magnetized patterns are patterns which will not be recognized as reproduction signals at a drive, into which the slave medium after magnetic transfer will be loaded.

16 Claims, 7 Drawing Sheets

MASTER INFORMATION CARRIER FOR MAGNETIC TRANSFER, MAGNETIC TRANSFER METHOD, AND MAGNETIC RECORDING MEDIUM

BACKGROUND OF THE INVENTION

1. Field of the Invention

The present invention relates to a master information carrier for magnetic transfer, which bears signal patterns on its surface, so as to magnetically transfer desired magnetized patterns onto a magnetic recording medium. The present invention also relates to a magnetic transfer method using the master information carrier. The present invention also relates to a magnetic recording medium.

2. Description of the Related Art

Conventionally, a magnetic transfer method for transferring magnetized patterns corresponding to information, carried by a master information carrier, onto a magnetic recording medium (slave medium) is well known. In this method, the master information carrier for magnetic transfer, which carries the information to be transferred, represented by very fine uneven patterns, is placed in close contact with the slave medium. Then, a magnetic field for transfer is applied to the master information carrier and the slave medium, which are in close contact with each other, and magnetized patterns are transferred onto the slave medium. In the magnetic transfer method, recording may be performed statically without changing the relative position of the master information carrier and the slave medium. Further, the magnetic transfer method has the advantage that the information can be recorded on the slave medium in a very short time (for example, please refer to Japanese Unexamined Patent Publication Nos. 10(1998)-040544, and 10(1998)-269566, or the like).

The application of the magnetic transfer technique to recording of servo signals for positioning a magnetic head on a magnetic recording medium is already proposed in Japanese Unexamined Patent Publication Nos. 10(1998)-040544 and 10(1998)-269566, or the like.

However, there is a technical problem in the magnetic transfer method. When signals are transferred from the master information carrier onto the slave medium, an unclear magnetic recording area (reversely magnetized area) is produced on the slave medium. If the unclear magnetic recording area is present on the slave medium, when the magnetized patterns are read out, a sub-pulse is detected in the waveform of the magnetized patterns. Therefore, there is a possibility that the sub-pulse is recognized as a reproduction signal by a magnetic reproduction apparatus, which may cause an error in reproduction. A method for observing the sub-pulse, generated by the unclear magnetic recording area, is disclosed in U.S. patent application Publication No. 20020044368, and Japanese Unexamined Patent Publication No. 2002-042301, for example.

However, the studies by the inventors of the present invention have revealed that it is possible to suppress generation of the sub-pulse considerably. Generation of the sub-pulse may be suppressed if a substrate made of a magnetic material is used as the substrate of the master information carrier, or if transfer conditions such as a pressure, applied to the master information carrier and the slave medium to place them in close contact with each other, is adjusted.

However, when servo signals are transferred, for example, an unclear magnetic recording area is produced on a slave medium after magnetic transfer. The unclear magnetic recording area is produced in a data area when the data area and a servo area are adjacent to each other in the direction along a track. Therefore, it is difficult to completely eliminate a sub-pulse, generated by the unclear magnetic recording area. An example will be described with reference to schematic diagrams illustrated in FIGS. 8A to 8C.

Figure 8A:
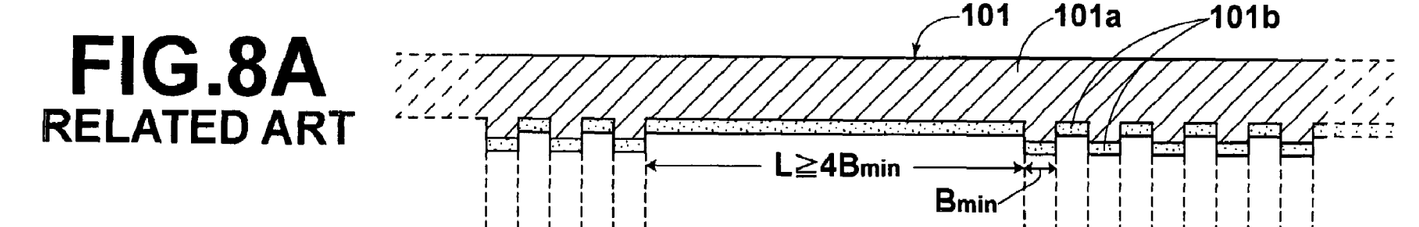
FIGS. 8A to 8C are schematic views for explaining problems in related art.
Figure 8B:
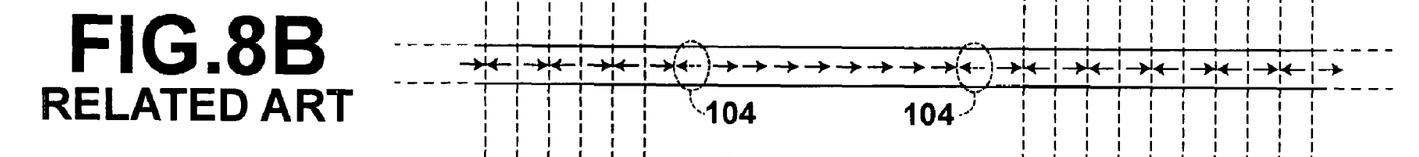
Figure 8C:
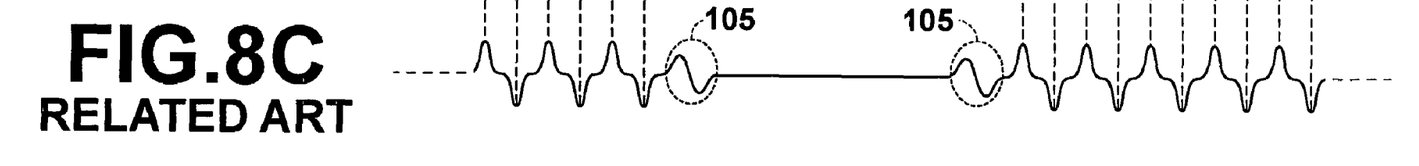

FIG. 8A is a schematic diagram illustrating a sectional view of a part of a master information carrier in the direction along a track. FIG. 8B is a schematic diagram illustrating magnetized patterns in a corresponding part of a slave medium, onto which the magnetized patterns are transferred from the master information carrier, illustrated in FIG. 8A. FIG. 8C is a schematic diagram illustrating a readout waveform, which is detected from the magnetized patterns. As illustrated in FIG. 8A, uneven patterns corresponding to desired information are formed on a master information carrier 101. The uneven patterns include protrusions and depressions, which have various bit lengths. If the minimum bit length (length in the direction along a track) among the various bit lengths is $B_{min}$, there are many depressions, each having a length L, which satisfies $L \geq 4B_{min}$. The master information carrier 101 includes a substrate 101a, made of a magnetic material such as Ni, for example. The substrate 101a bears uneven patterns corresponding to the desired information on its surface. The master information carrier 101 also includes a magnetic layer 101b, which is provided on the surface of the uneven patterns of the substrate 101a. The surface of the master information carrier 101, which bears the magnetic layer 101b, and a magnetic recording layer of the slave medium, on which direct current magnetization has been carried out in advance in one direction along the track, are placed in close contact with each other. While they are in close contact with each other, a magnetic field for transfer is applied in a direction opposite to that of the direct current magnetization. Accordingly, the magnetized patterns as illustrated in FIG. 8B are recorded on the slave medium. At this time, unclear magnetic recording areas 104 are produced at both ends of an area corresponding to the depression, which has the length L. Further, the readout waveform as illustrated in FIG. 8C is detected from the magnetized patterns, which are illustrated in FIG. 8B. As illustrated in FIG. 8C, sub-pulses 105, which correspond to the unclear magnetic recording areas 104, are detected. Specifically, the sub-pulses are detected at a reproduction apparatus for reproducing data from magnetic recording mediums. Therefore, there is a possibility that the detected sub-pulses may be incorrectly recognized as reproduction signals. For example, when sub-pulses are generated at both ends of a servo area, the timing of the beginning and end of the servo signal area is incorrectly recognized. Therefore, the servo timing is shifted, and there is a possibility that an error such as failure in servo tracking will be caused.

SUMMARY OF THE INVENTION

In view of the foregoing circumstances, it is an object of the present invention to provide a master information carrier for magnetic transfer, which can transfer magnetized patterns onto a slave medium so that sub-pulses are not incorrectly recognized during signal reproduction.

A master information carrier for magnetic transfer according to the present invention is a master information carrier for magnetically transferring desired information onto a slave medium, the master information carrier for magnetic transfer comprising:

uneven signal patterns corresponding to the desired information, which are formed along a track, wherein when a minimum bit length in the uneven signal patterns is $B_{min}$, dummy uneven patterns, which are different from the uneven signal patterns, are formed in a depression of the uneven signal patterns, which has a length of $4B_{min}$ or longer in the direction along the track.

The "dummy uneven patterns, which are different from the uneven signal patterns," are patterns for transferring magnetized patterns, which will not be recognized as reproduction signals at a drive (magnetic reproduction apparatus), into which the magnetic recording medium after magnetic transfer will be loaded. Here, as the case of "not being detected as reproduction signals", there is a case in which a waveform is detected by a magnetic head for reproduction in the drive, but not recognized as reproduction signals at the drive. There is also a case in which a waveform is not even detected at the magnetic head for reproduction in the drive.

The case in which the waveform is detected by a magnetic head for reproduction in the drive, but not recognized as reproduction signals at the drive is a case in which a waveform beyond a frequency range and/or amplitude range of a waveform of signals which can be converted into reproduction signals at the drive according to the specification of the drive are detected by the magnetic head for reproduction. Consequently, the signals are not converted into reproduction signals, and they are not recognized as reproduction signals.

As actual dummy uneven patterns which will be detected by the magnetic head for reproduction in the drive, but will not be recognized as reproduction signals at the drive, there are dummy uneven patterns including protrusions and depressions, which are formed in the direction along the track in a cycle different from the formation cycle of the uneven signal patterns. There are also dummy uneven patterns including protrusions and depressions, which are formed so that they are randomly arranged with respect to both the direction along the track and the width direction of the track. In this case, when the protrusions and depressions are randomly arranged, the waveform of the dummy uneven patterns is a waveform, which will not be recognized as reproduction signals by the magnetic head.

Further, as a case in which a waveform is not detected at the magnetic head for reproduction in the drive, there is a case in which the dummy uneven patterns are formed so that the ratio between the depression area and the protrusion area in the width direction of the track is approximately 1:1. There is also a case in which the dummy uneven patterns include protrusions and depressions, which are formed in a cycle corresponding to the null gap length of the magnetic head for reproduction. The null gap length Lnull represents a range satisfying $0.99MRG \leq Lnull \leq 1.13MRG$ when a reproduction gap length of a GMR (Giant Magneto Resistive) head in the drive, into which the slave medium is loaded, is MRG (μm). When the depression area and the protrusion area are formed in a cycle λnull, which corresponds to the null gap length, and the ratio between the depression area and the protrusion area is approximately 1:1, magnetized patterns corresponding to the depressions and protrusions, which are transferred onto the slave medium, are not detected by the magnetic head for reproduction.

As an example of forming the dummy uneven patterns in a track so that the ratio between the depression area and the protrusion area in the width direction of the track is 1:1, there is a case in which the dummy uneven patterns include protrusions and depressions, which are formed in a cycle, obtained by multiplying the width (W) of the track with the reciprocal of an even number. There is also a case in which the dummy uneven patterns include protrusions and depressions, which are formed at an angle of 30 degrees or more with respect to the width direction of the track. Specifically, the reciprocal of an even number is ½, ¼ . . . ½n (n is a natural number).

A magnetic transfer method according to the present invention is a method of magnetic transfer, comprising the steps of:

placing a master information carrier for magnetic transfer according to the present invention into close contact with a slave medium; and applying a magnetic field for transfer onto the conjoined body formed by the master information carrier and the slave medium, thereby transferring magnetized patterns based on transfer patterns borne on the master information carrier onto the slave medium.

A magnetic recording medium according to the present invention is a magnetic recording medium, wherein magnetized signal patterns corresponding to desired information are recorded along a track, wherein when a minimum bit length in the magnetized signal patterns is $B_{min}$, dummy magnetized patterns, which are different from the magnetized signal patterns, are formed in a unidirectionally magnetized area having a length of $4B_{min}$ or longer in the direction along the track in the magnetized signal patterns.

Here, the "dummy magnetized patterns, which are different from the magnetized signal patterns" are magnetized patterns, which will not be recognized as reproduction signals at the drive, into which the magnetic recording medium will be loaded. As a case of "not being recognized as reproduction signals", there is a case in which the waveform of the magnetized patterns is detected by the magnetic head for reproduction in the drive, but the detected waveform is not recognized as reproduction signals in the drive. There is also a case in which the waveform of the magnetized patterns is not detected by the magnetic head for reproduction in the drive.

As an example of the "master information carrier for magnetic transfer", there is a master information carrier including only a substrate made of a magnetic material, which bears uneven patterns on its surface. There is also a master information carrier including a substrate, bearing uneven patterns on its surface, and a magnetic layer, which is layered at least on the upper surfaces of the protrusions of the substrate. There is also a master information carrier including a flat substrate and a magnetic layer bearing uneven patterns on its surface, which is formed on the flat substrate. Here, the master information carrier may be a master information carrier including a substrate bearing uneven patterns formed on its surface and a magnetic layer, with which the depressions of the substrate are filled. Specifically, the master information carrier may be a master information carrier, bearing uneven patterns on its surface. Additionally, the master information carrier may be a master information carrier having a flat surface. The depressions are filled with the magnetic layer to form the flat surface. In the master information carrier which has the substrate bearing uneven patterns on its surface and the magnetic layer, with which the depressions of the substrate are filled, the magnetic layer, with which the depressions of the substrate are filled, corresponds to the protrusions of the master information carrier, which has uneven patterns on its surface. In the master information carrier which has the substrate bearing uneven patterns on its surface and the magnetic layer, with which the depressions of the substrate are filled, the protrusions of the substrate correspond to the depressions of the master information carrier, which has uneven patterns on its surface.

As preferred examples of the uneven signal patterns, there are uneven signal patterns that carry servo signals. However, actual signals patterns in the present invention are not limited to the signal patterns carrying the servo signals. The signal patterns may carry various kinds of data signals.

Further, when a readout waveform is detected from magnetized patterns of a slave medium by a magnetic head for reproduction, and converted into reproduction signals, the frequency range and/or amplitude range of the waveform of signals, which may be converted into reproduction signals, is different according to the specification of the drive and channels. Specifically, the waveform of signals, which may be recognized as reproduction signals, are different according to the specification of the drive and the channels. Therefore, different dummy uneven patterns are formed based on the signal format of the uneven signal patterns. For example, when actual signal patterns are patterns, which carry servo signals, which should be reproduced in an initial format mode of the magnetic reproduction apparatus, dummy uneven patterns for transferring dummy magnetized patterns, which will not be recognized as a part of the servo signals at a servo channel, should be provided. Further, if the dummy uneven patterns are provided in a data signal area, dummy uneven patterns for transferring dummy magnetized patterns, which will not be recognized as a part of data signals at a data channel, should be provided.

In the master information carrier for magnetic transfer according to the present invention, when the minimum bit length in uneven signal patterns is $B_{min}$, dummy uneven patterns, which are different from the uneven signal patterns, are formed in a depression of the uneven signal patterns, which has a length of $4B_{min}$ or longer in the direction along the track. In the present invention, magnetized patterns, which will not be recognized as reproduction signals at a drive, into which a slave medium after magnetic transfer will be loaded, are transferred onto the slave medium. Therefore, the present invention can prevent production of an unclear magnetic recording area when magnetized patterns are transferred onto the slave medium. Further, the present invention can prevent incorrect recognition of signals due to generation of sub-pulses when signals are reproduced from the slave medium after transfer.

Further, when the master information carrier according to the present invention can transfer servo signals onto a slave medium so that the servo signals are obtained as reproduction signals, if the master information carrier is used to transfer magnetized patterns, a magnetic recoding medium can be produced so that the servo signals are not incorrectly recognized, and highly accurate tracking servo control is possible.

In the magnetic recording medium according to the present invention, when a minimum bit length in the magnetized signal patterns is $B_{min}$, dummy magnetized patterns, which are different from the magnetized signal patterns, are formed in a unidirectionally magnetized area in the magnetized signal patterns, which has a length of $4B_{min}$ or longer in the direction along the track. Since there is no unclear recording area, sub-pulses are not generated, and signals are not incorrectly recognized due to generation of sub-pulses during reproduction of the signals.

DESCRIPTION OF THE PREFERRED EMBODIMENTS

Hereinafter, embodiments of the present invention will be described in detail with reference to the attached drawings.

Figure 1:
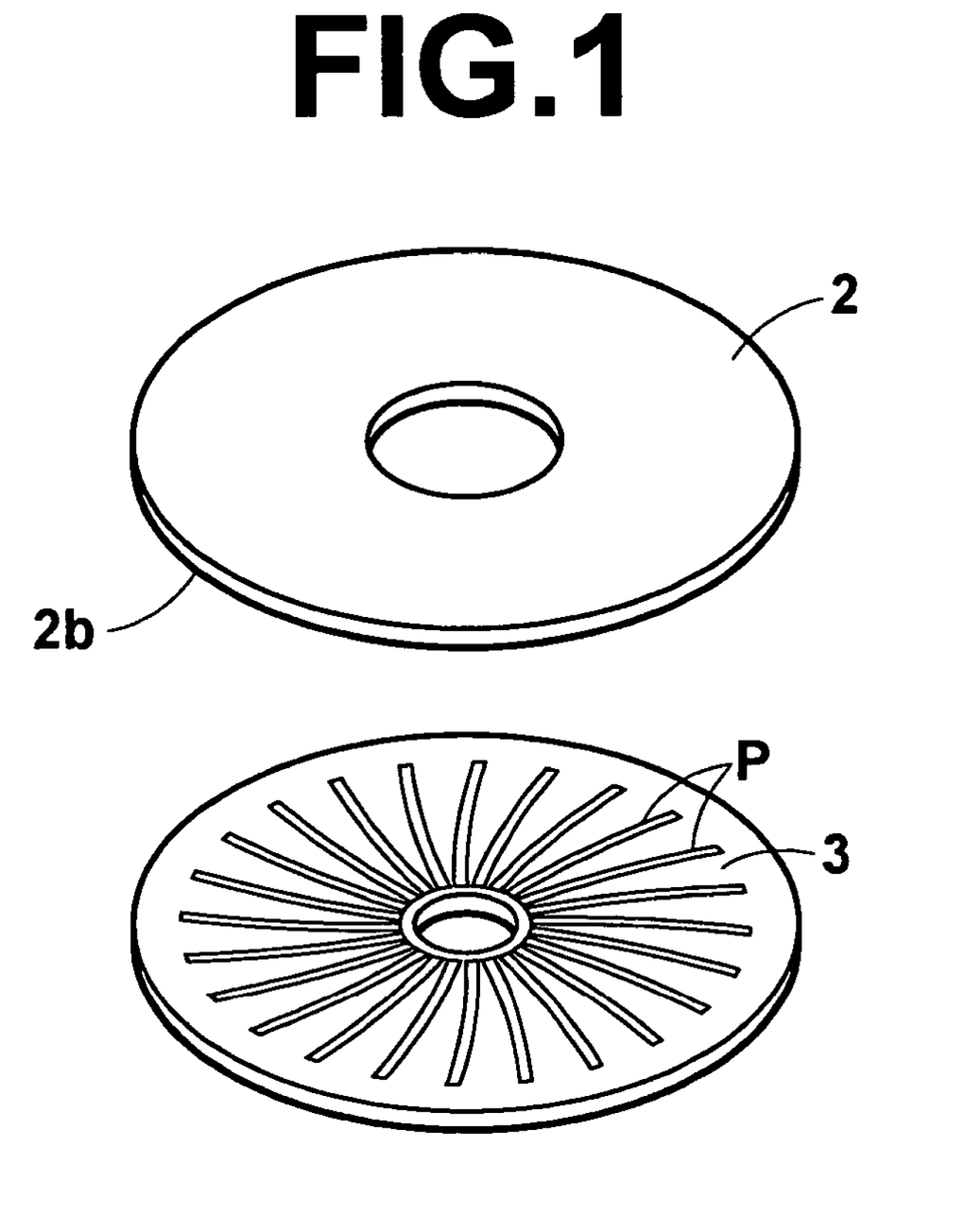
FIG. 1 is a perspective view illustrating a master information carrier and magnetic recording medium according to embodiments of the present invention.

FIG. 1 is a perspective view illustrating a master information carrier 3 for magnetic transfer and a slave medium (a medium, onto which information is transferred) 2. The slave medium is a disk-shaped magnetic recording medium, such as a hard disk or a flexible disk. A magnetic recording layer is formed on each or only one surface of the disk-shaped magnetic recording medium. Further, in the present embodiment, a recording surface 2b including an in-plane magnetic recording layer 22 is formed on one side of a disk-shaped substrate 21 (please refer to FIGS. 4A-4C).

As illustrated in FIG. 1, a servo area P, in which very fine uneven patterns corresponding to servo signals are formed, is provided on the surface of the master information carrier 3. Generally, approximately 60 to 200 servo areas P are provided around the track. Further, in addition to the uneven signal patterns corresponding to the servo signals, dummy uneven patterns, which are different from the uneven signal patterns, are provided in the servo area P of the master information carrier 3 according to the present invention.

Figure 2A:
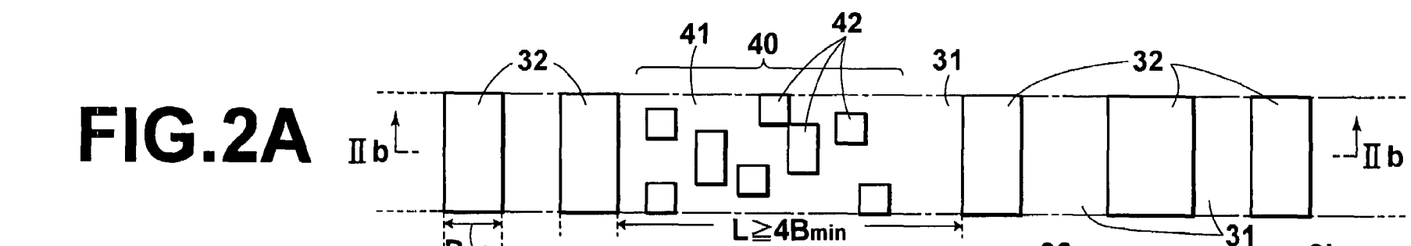
FIG. 2A is a plan view illustrating a part of a track on a master information carrier according to a first embodiment of the present invention.
Figure 2B:
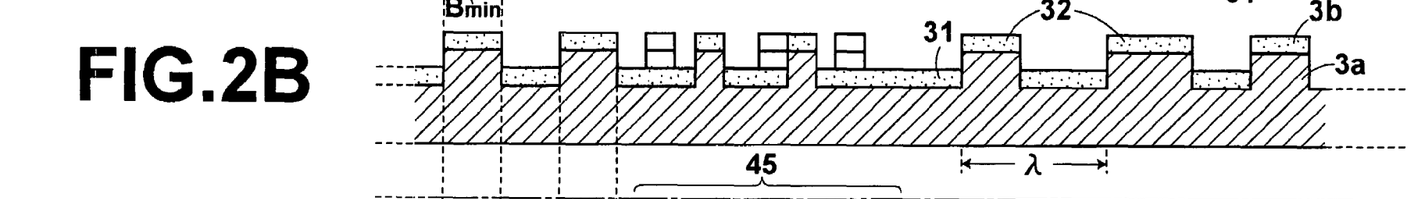
FIG. 2B is a sectional view illustrating a part of the master information carrier.
Figure 2C:
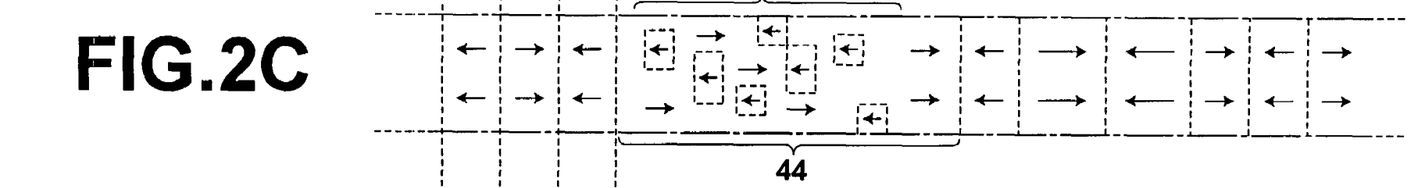
FIG. 2C is a schematic diagram illustrating magnetized patterns on a slave medium.
Figure 2D:
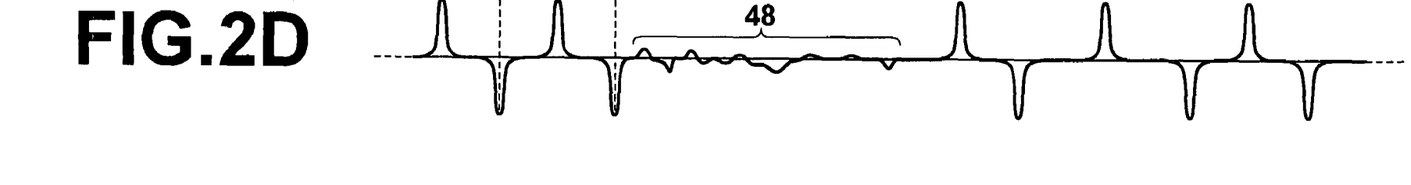
FIG. 2D is a schematic view illustrating a reproduced waveform.

FIG. 2A is a plan view illustrating a part of a track on a master information carrier, which is illustrated in FIG. 1, according to a first embodiment of the present invention. FIG. 2B is a sectional view taken along line IIb-IIb of FIG. 2A. FIG. 2C is a schematic plan view illustrating magnetized patterns, which are formed on a slave medium by magnetically transferring patterns from the part of the master information carrier, illustrated in FIG. 2A, onto the slave medium. FIG. 2D is a schematic view illustrating a read-out waveform, which is detected from the magnetized patterns, illustrated in FIG. 2C, by a magnetic head for reproduction.

As illustrated in FIGS. 2A and 2B, basically, the master information carrier 1 includes a substrate 3a, which bears uneven patterns on its surface, and a ferromagnetic layer 3b. The ferromagnetic layer 3b should be formed at least on the upper surfaces of the protrusions of the uneven patterns.

In FIG. 2A, a reproduction track is illustrated with dash-dotted lines. In FIG. 2A, uneven patterns, which are formed in the reproduction track, are illustrated. Uneven signal patterns, which carry signals, include depressions 31 and protrusions 32, which are formed in a predetermined range of cycle. When the minimum bit length is $B_{min}$, dummy uneven patterns 40 are formed in a depression 31, which has a length L, which is $4B_{min}$ or longer, in the direction along a track. The dummy uneven patterns 40 are uneven patterns, which are formed by randomly arranging protrusions 42 in the depression 31 with respect to both the direction along the track and the width direction of the track. Therefore, depressions 41 of the dummy uneven patterns may be regarded as being formed by the depression 31 of the uneven signal patterns. It is required that the protrusions of the dummy uneven patterns are not formed continuously from the protrusions 32 of the uneven signal patterns, which are next to the depression 31, in which the dummy uneven patterns are formed. It is required that the protrusions of the dummy uneven patterns and the protrusions 32 next to the depression 31 are spaced from each other at least by approximately $0.1B_{min}$.

Magnetized patterns, as illustrated in FIG. 2C, are transferred from a master information carrier for magnetic transfer, which bears uneven patterns, as illustrated in FIG. 2A. The magnetized patterns are transferred onto a slave medium and recorded on the slave medium by a magnetic transfer method, which will be described later. Reverse magnetized patterns corresponding to the uneven patterns, which are formed on the surface of the master information carrier, are formed on the slave medium. Magnetized signal patterns corresponding to the uneven signal patterns and dummy magnetized patterns 45 corresponding to the dummy uneven patterns 40 are formed on the slave medium. Magnetic domains, which are magnetized to the right in FIG. 2C, correspond to the depressions of the master information carrier, which is illustrated in FIG. 2A. Magnetic domains, which are magnetized to the left in FIG. 2C, correspond to the protrusions of the master information carrier, which is illustrated in FIG. 2A.

When magnetized patterns are magnetically transferred onto a slave medium from a conventional master information medium, which bears only uneven signal patterns, unclear magnetic recording areas, which may generate sub-pulses, are produced at both ends of a unidirectionally magnetized area 44 in the magnetized signal patterns, which has a length of $4B_{min}$ or longer in the direction along the track. The unidirectionally magnetized area 44 in the magnetized signal patterns corresponds to the depression 31 of the uneven signal patterns, which has a length of $4B_{min}$ or longer in the direction along the track. However, if the master information carrier according to the present embodiment is used, dummy magnetized patterns are formed in the unidirectionally magnetized area 44 corresponding to the depression 31, which has a length of $4B_{min}$ or longer in the direction along the track. Therefore, the unclear magnetic recording area is not produced.

The waveform of magnetized patterns, which is read out by the magnetic head of the drive, corresponds to the magnetized patterns, as illustrated in FIG. 2D. Specifically, the readout waveform as illustrated in FIG. 2D is detected by the magnetic head in the drive. A waveform 48, which is detected from the area of the dummy magnetized patterns, is not cyclical, and the amplitude of the waveform 48 is small. Therefore, the waveform 48 is not recognized as the waveform of reproduction signals.

The dummy uneven patterns may include protrusions and depressions, which are formed cyclically, as far as the formation cycle of the dummy uneven patterns is different from the cycle λ of the uneven signal patterns (λmin≦λ≦λmax). For example, when the uneven signal patterns are servo signals, the cycle λ of the uneven signal patterns is determined based on a signal format, which is defined at a servo channel circuit of a drive (magnetic reproduction apparatus). The drive is an apparatus for reproducing data from a magnetic recording medium, onto which the servo patterns are magnetically transferred from the master information carrier. Therefore, the dummy uneven patterns should be formed in a cycle which will not be recognized as the signal format of signals, which are transmitted at the servo channel.

In the description of the master information carrier according to the present embodiment, it is assumed that the servo signals are transferred. However, signals, which are transferred from the master information carrier according to the present embodiment, are not limited to the servo signals. The master information carrier according to the present embodiment may transfer various kinds of data signals. When there is a depression, which has a length of $4B_{min}$ or longer in the direction along the track, in the uneven signal patterns corresponding to desired data, dummy uneven patterns may be formed in the depression.

Further, in the embodiment as described above, the reproduction signals are servo signals, and the dummy uneven patterns are formed so that magnetized patterns, which are not reproduced at the servo channel, are transferred. However, if the reproduction signals are data signals, the dummy uneven patterns are formed so that magnetized patterns, which are not reproduced at the data channel, are transferred. As described above, generally, the signal format of the servo signals and the signal format of the data signals are different from each other. Specifically, the signal format of signals transmitted through the servo channel of the magnetic reproduction apparatus and the signal format of signals transmitted through the data channel of the magnetic production apparatus are different from each other. Therefore, the uneven signal patterns are formed based on the purpose of the uneven signal patterns, and the dummy uneven patterns should be changed accordingly. Further, the signal format is also different according to the specification of each magnetic recording reproduction apparatus. Therefore, it is necessary to form the uneven signal patterns and the dummy uneven patterns according to the specification of the magnetic recording reproduction apparatus. Here, the signal format is mainly defined by the frequency and amplitude of the readout waveform. Signals, which are within a predetermined frequency range and a predetermined amplitude range in the readout waveform, are detected as reproduction signals.

Next, an embodiment of a magnetic transfer method for transferring information to a slave medium by using the master information carrier for magnetic transfer according to the present invention will be described.

In FIG. 1, the magnetic recording medium 2 and the master information carrier 3 are spaced from each other. However, when magnetic transfer is actually performed, the recording surface 2b of the magnetic recording medium 2 and the surface of the master information carrier 3, which bears the transfer patterns, are placed in close contact with each other.

Figure 3:
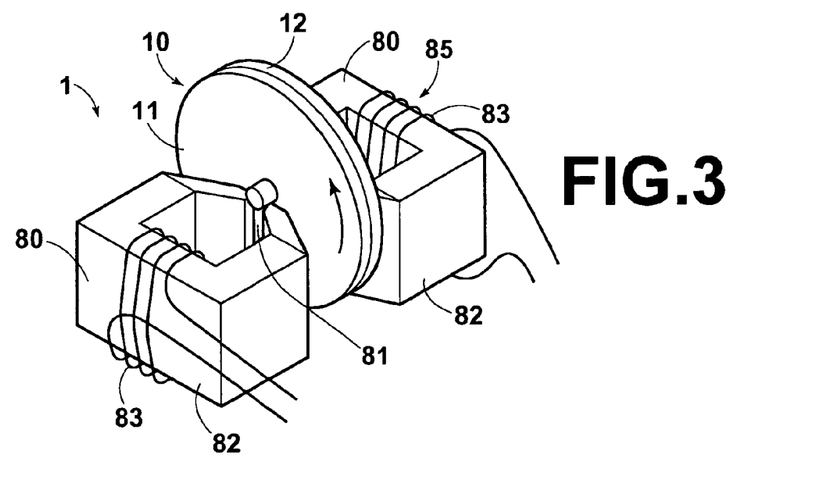
FIG. 3 is a perspective view illustrating the schematic configuration of a magnetic transfer apparatus.

FIG. 3 is a perspective view illustrating the schematic configuration of a magnetic transfer apparatus 1 for magnetically transferring information by using the master information carrier according to the present embodiment.

The magnetic transfer apparatus 1 includes a transfer holder 10 for holding the master information carrier 3 and the slave medium 2. The magnetic transfer apparatus 1 also includes a pressure means, which is not illustrated, for placing the master information carrier 3 and the slave medium 2 in close contact with each other by applying pressure from both sides of the transfer holder 10. The magnetic transfer apparatus 1 also includes a magnetic field application means 85 for applying a magnetic field for transfer while rotating the transfer holder 10.

The magnetic field application means 85 includes electromagnetic apparatuses 80, 80, which are arranged at both sides of the transfer holder 10. A coil 83 is wound around a core 82, which has a gap 81 extending in the direction of the radius of the transfer holder 10. Both of the electromagnetic apparatuses 80, 80 generate magnetic fields in the same direction in parallel with the direction of the track. Further, the magnetic field application means 85 may include permanent magnetic apparatuses instead of the electromagnetic apparatuses. In the case of perpendicular recording, the magnetic field application means may be configured by arranging electromagnets or permanent magnets, which have opposite polarities from each other, at both sides of the transfer holder 10. In other words, in the case of perpendicular recording, a magnetic field for transfer is generated in a direction perpendicular to the surface on which the track is formed.

Further, in the magnetic field application means 85, the electromagnetic apparatuses 80, 80 at both sides of the transfer holder 10 move away from or toward the transfer holder 10 so as to allow opening/closing operations of the transfer holder 10. Alternatively, the electromagnetic apparatuses 80, 80 or the transfer holder 10 move so that the transfer holder 10 can be inserted between the electromagnetic apparatuses 80, 80.

The transfer holder 10 includes a holder 11 on one side and a holder 12 on the other side, which can relatively move away from or toward each other. The transfer holder 10 has an inner space, which is formed in the inside of the transfer holder 10. The transfer holder 10 holds the slave medium 2 and the master information carrier 3 in the inner space so that the slave medium 2 and the master information carrier 3 are placed in close contact with each other, and the center of the slave medium 2 is positioned at the center of the master information carrier 3. Supporting shafts project from the rear side of both the holder 11 on one side and the holder 12 on the other side. Each of the supporting shafts is provided at the center of the rear side. The shaft is supported by the apparatus body of the electromagnetic apparatus 80, and connected to a rotation mechanism. Accordingly, the shaft is rotated during magnetic transfer.

The rear surface of the master information carrier 3, which is opposite to the surface that bears transfer patterns, is held by the holder 11 on one side. The slave medium 2 is delivered to the holder 11 on one side so that the surface, which bears the transfer patterns, of the master information carrier 3 and the magnetic recording surface of the slave medium 2 face each other. Then, the holder 12 on the other side approaches the holder 11 on one side. Accordingly, the master information carrier 3 and the slave medium 2 are held between the two holders 11 and 12. Each of the holder 11 and the holder 12 is pressured from its rear side by a pressure means, which is not illustrated. Accordingly, the master information carrier 3 and the slave medium 2 are held so that they are in close contact with each other.

Next, a magnetic transfer method using the magnetic transfer apparatus 1 will be described. The transfer holder 10 of the magnetic transfer apparatus 1 is used to sequentially perform magnetic transfer on a plurality of slave mediums 2 by using a single master information carrier 3 or a set of master information carriers 3. First, the master information carrier 3 is held by the holder 11 on one side after positioning. Then, in an open state, in which the holder 11 on one side and the holder 12 on the other side are spaced from each other, a slave medium 2, which has been initially magnetized in an in-plane direction or a perpendicular direction in advance, is set so that the center of the slave medium 2 is positioned at the center of the master medium 3. Then, the holder 12 on the other side is moved so that the holder 12 approaches the holder 11 on one side. While the transfer holder 10 holds the slave medium 2 and the master information carrier 3 by placing them between the two holders 11 and 12, a load is applied by the pressure means from the rear side of each of the holder 11 and holder 12. Accordingly, close-contact force is evenly applied to the slave medium 2 and the master information carrier 3, and the slave medium 2 and the master information carrier 3 are placed in close contact with each other.

Then, the electromagnetic apparatuses 80 are moved close to both sides of the transfer holder 10. A magnetic field for transfer is applied by the electromagnetic apparatuses 80 in a direction approximately opposite to the direction of initial magnetization while the transfer holder 10 is rotated. Accordingly, magnetized patterns corresponding to the transfer patterns of the master information carrier 3 are transferred onto the magnetic recording layer of the slave medium 2.

Figure 4A:
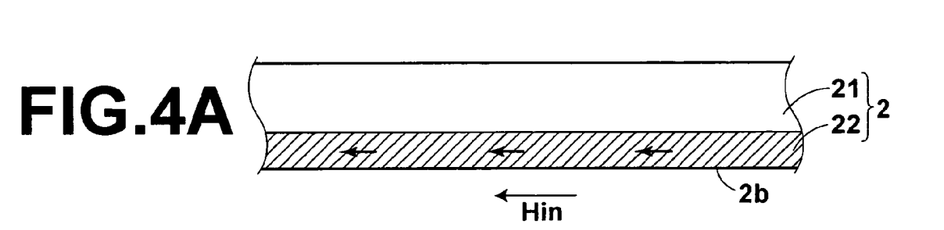
FIG. 4A is a diagram illustrating a process of magnetic transfer.
Figure 4B:
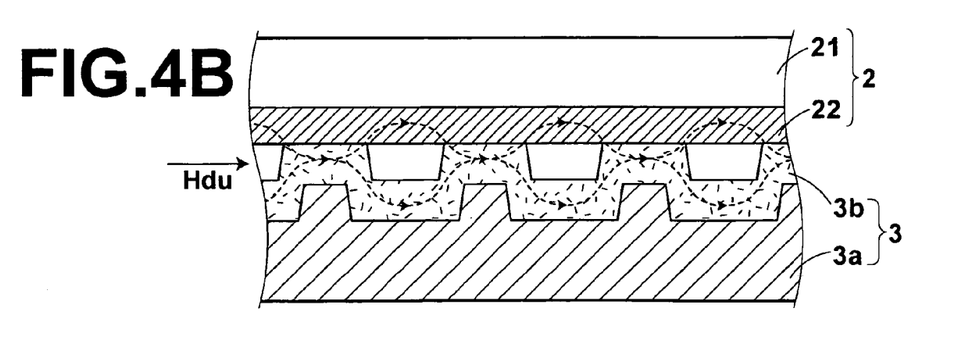
FIG. 4B is a diagram illustrating a process of magnetic transfer.
Figure 4C:
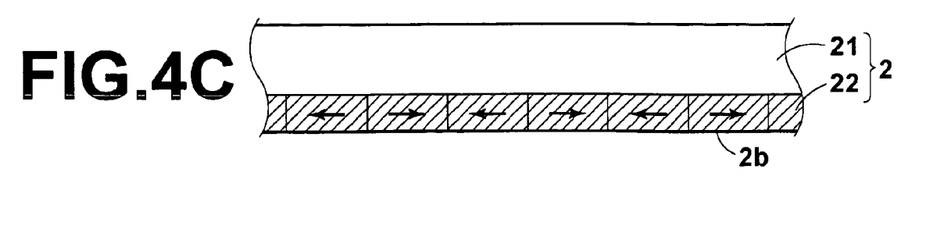
FIG. 4C is a diagram illustrating a process of magnetic transfer.

FIGS. 4A-4C are diagrams for explaining basic processes for magnetically transferring information onto a slave medium 2, which is an in-plane magnetic recording medium. FIG. 4A is a diagram illustrating the process of performing initial direct-current magnetization on the slave medium by applying a magnetic field in one direction. FIG. 4B is a diagram illustrating a process of applying a magnetic field in a direction substantially opposite to the direction of the initial direct-current magnetization while the master information carrier and the slave medium are placed in close contact with each other. FIG. 4C is a diagram illustrating the state of the recording/reproduction surface of the slave medium after magnetic transfer.

As illustrated in FIG. 4A, initial direct-current magnetization is performed on the magnetic recording layer 22 in advance by applying an initial direct-current magnetic field Hin to the slave medium 2 in one direction along the track.

Then, as illustrated in FIG. 4B, the recording surface 2b of the slave medium 2 and the surface of the master information carrier 3, which bears transfer patterns, are placed in close contact with each other. Then, a magnetic field Hdu for transfer is applied in the direction along the track of the slave medium 2. The direction of the magnetic field Hdu for transfer is opposite to the direction of the initial direct-current magnetic field Hin. The magnetic field Hdu for transfer is absorbed in the protrusions of the master information carrier 3 at positions where the slave medium 2 and the transfer patterns of the master information carrier 3 are placed in close contact with each other. Magnetization at corresponding positions of the slave medium 2 is not reversed, and initial magnetization at other area of the slave medium 2 is reversed. Consequently, as illustrated in FIG. 4C, information (for example, servo signals) corresponding to the uneven patterns of the master information carrier 3 is magnetically transferred onto the magnetic recording layer 22 in the lower recording surface 2b of the slave medium 2.

When the processes of magnetic transfer, as described above, are performed, the uneven patterns on the surface of the master information carrier 3, as illustrated in FIG. 2A, are transferred onto the slave medium, and magnetized patterns, as illustrated in FIG. 2C, are recorded on the slave medium 2.

In the present embodiment, the magnetic recording surface is provided only on one side of the slave medium 2. However, both surfaces of the slave medium 2 may be magnetic recording surfaces. When both surfaces of the slave medium 2 are magnetic recording surfaces, information may be simultaneously transferred onto both of the magnetic recording surfaces. Alternatively, information may be sequentially transferred onto each of the magnetic recording surfaces.

Further, values of the initial direct-current magnetic field and the magnetic field for transfer should be determined based on the coercivity of the slave medium 2, the relative magnetic permeability of the master information carrier 3 and the slave medium 2, or the like.

In the embodiments as described above, as an example of dummy uneven patterns for transferring magnetized patterns, which will be detected by the magnetic head for reproduction in the drive, but will not be recognized as reproduction signals according to the specification of the drive, uneven patterns including protrusions and depressions, which are randomly formed in the track with respect to both the direction along the track and the width direction of the track, were described. Next, an example of dummy uneven patterns for transferring magnetized patterns, which will not be detected by the magnetic head for reproduction in the drive, will be described. In the following descriptions, only the differences from the first embodiment will be described. Descriptions regarding elements similar to the elements in embodiment 1 will be omitted unless particularly necessary.

Figures 5A, 5B:
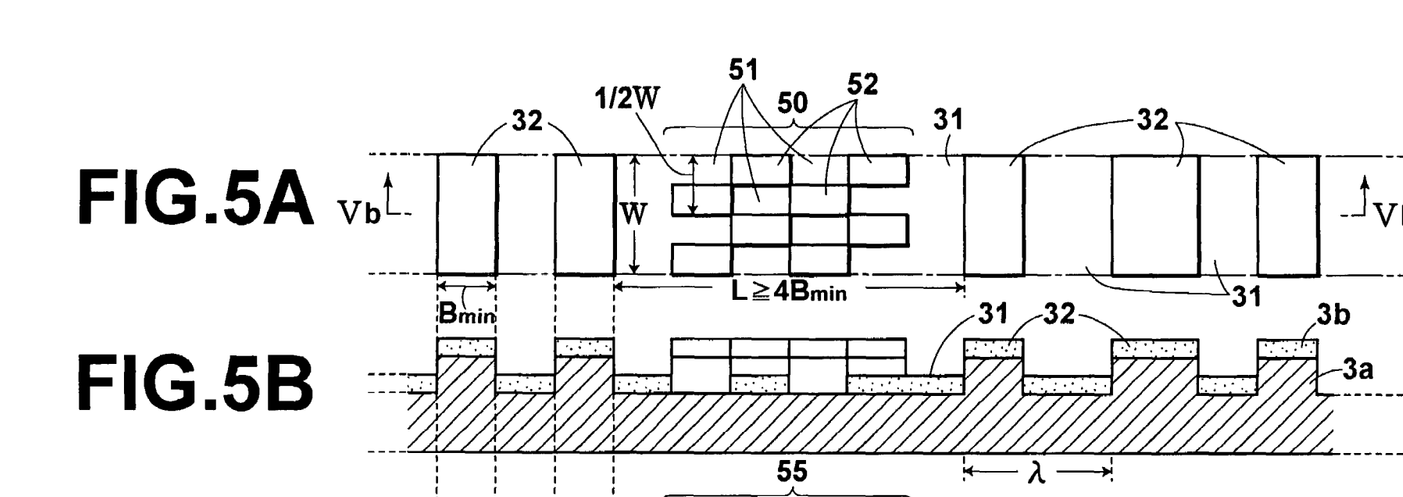
FIG. 5A is a plan view illustrating a part of a track on a master information carrier according to a second embodiment of the present invention.
FIG. 5B is a sectional view illustrating a part of the master information carrier.
Figure 5C:
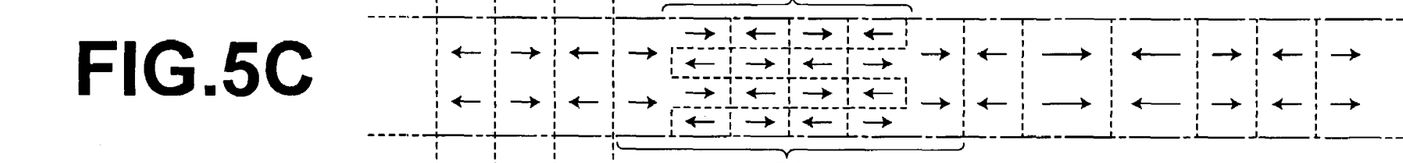
FIG. 5C is a schematic view illustrating magnetized patterns on a slave medium.
Figure 5D:
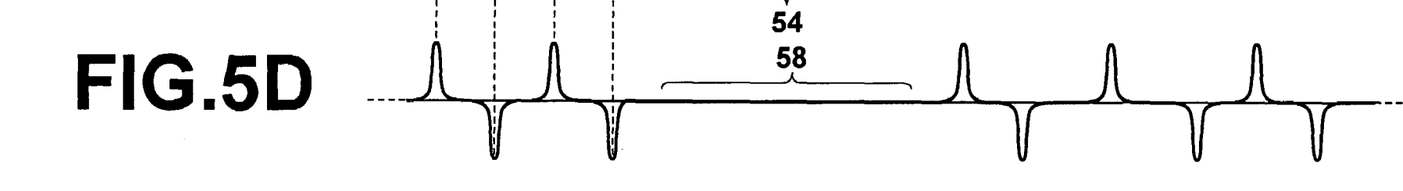
FIG. 5D is a schematic view illustrating a reproduced waveform.

FIG. 5A is a plan view illustrating a part of a track on a master information carrier according to a second embodiment of the present invention. FIG. 5B is a sectional view taken along line Vb-Vb of FIG. 5A. FIG. 5C is a schematic plan view illustrating magnetized patterns, which are formed on the slave medium by magnetically transferring information from the part of the master information carrier, which is illustrated in FIG. 5A, to the slave medium. FIG. 5D is a schematic view illustrating a readout waveform, which is detected from the magnetized patterns, illustrated in FIG. 5C, by the magnetic head for reproduction.

In the master information carrier according to the present embodiment, the dummy uneven patterns 50 are formed so that the ratio of the depression area and the protrusion area in the width direction of the track is approximately 1:1. In the width direction of the track, depressions 51 and protrusions 52 are formed in a cycle of half of the width (W) of the track.

As illustrated in FIG. 5C, when magnetic transfer is performed by using the master information carrier according to the present embodiment, magnetized signal patterns corresponding to the uneven signal patterns are transferred onto the recording surface of the slave medium. At the same time, dummy magnetized patterns 55 corresponding to the dummy uneven pattern 50 are transferred to a unidirectionally magnetized area 54 in the magnetized signal patterns. In the dummy magnetized patterns 55, the ratio of the area, which is magnetized to the right in FIG. 5C, and the area, which is magnetized to the left in FIG. 5C, is approximately 1:1.

As illustrated in FIG. 5D, the dummy magnetized patterns 55 are not detected by the magnetic head for reproduction. Therefore, the waveform of the dummy magnetized patterns is a waveform 58, which represents no signal. Since the dummy magnetized patterns 55 are not detected by the magnetic head for reproduction, they are not recognized as reproduction signals.

Figure 6A:
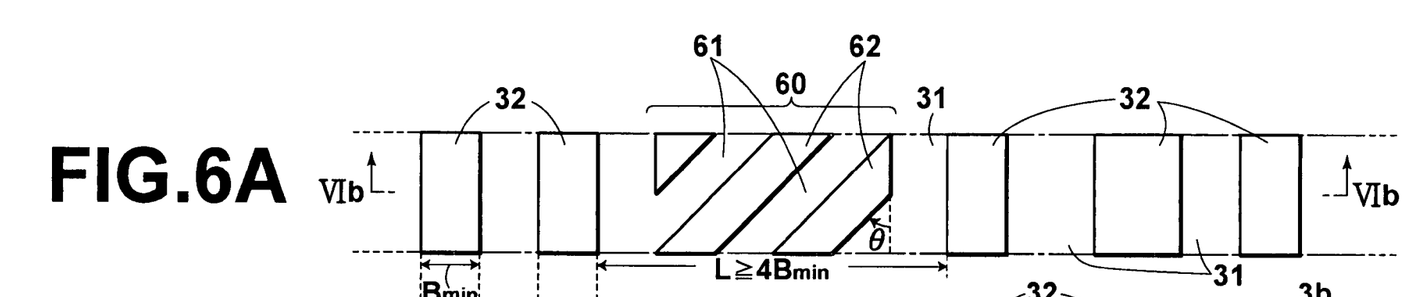
FIG. 6A is a plan view illustrating a part of a track on a master information carrier according to a third embodiment of the present invention.
Figures 6B, 6C:
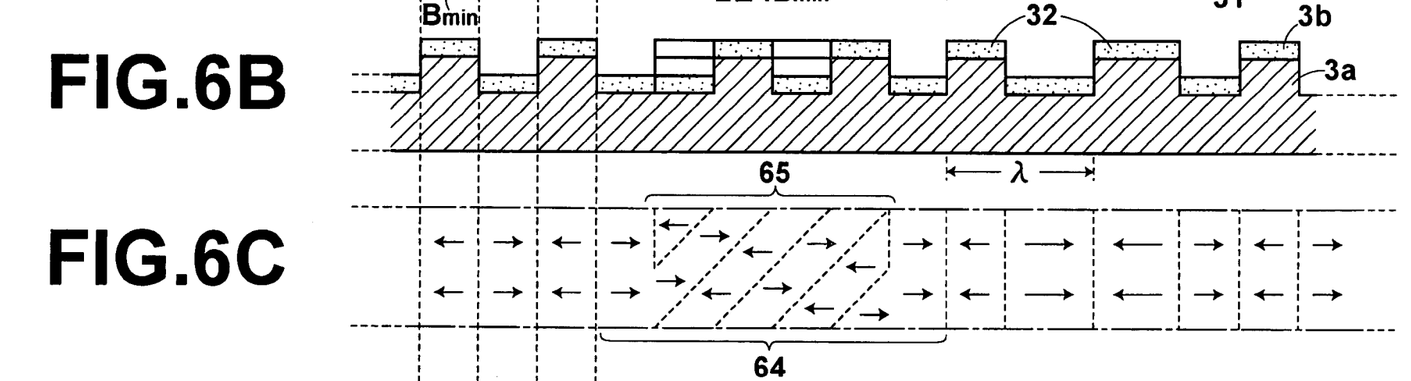
FIG. 6B is a sectional view illustrating a part of the master information carrier.
FIG. 6C is a schematic view illustrating magnetized patterns on a slave medium.
Figure 6D:
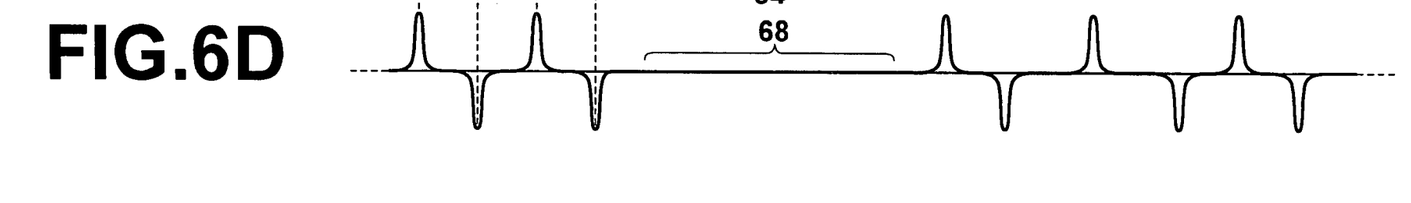
FIG. 6D is a schematic view illustrating a reproduced waveform.

FIG. 6A is a plan view illustrating a part of a track of a master information carrier according to a third embodiment of the present invention. FIG. 6B is a sectional view taken along line VIb-VIb of FIG. 6A. FIG. 6C is a schematic plan view illustrating magnetized patterns, which are provided on the slave medium by magnetically transferring information from the part of the master information carrier, illustrated in FIG. 6A, onto the slave medium. FIG. 6D is a schematic view illustrating a readout waveform, which is detected by the magnetic head for reproduction from the magnetized patterns, which are illustrated in FIG. 6C.

In the master information carrier according to the present embodiment, dummy uneven patterns 60 are formed in a similar manner to the master information carrier according to the second embodiment. The dummy uneven patterns 60 are formed so that the ratio between the depression area and the protrusion area in the width direction of the track is approximately 1:1. However, the present embodiment is different from the second embodiment in that depressions 61 and protrusions 62 of the present embodiment are formed so that an angle θ is approximately 45 degrees with respect to the width direction of the track.

As illustrated in FIG. 6C, when the master information carrier according to the present embodiment is used to perform magnetic transfer, magnetized signal patterns corresponding to the uneven signal patterns are transferred onto the recording surface of the slave medium. At the same time, dummy magnetized patterns 65 corresponding to the dummy uneven patterns 60 are transferred onto a unidirectionally magnetized area 64 in the magnetized signal patterns. In the dummy magnetized patterns 65, the ratio between the area, which is magnetized to the right in FIG. 6C, and the area, which is magnetized to the left in FIG. 6C, is approximately 1:1 in the width direction of the track.

As illustrated in FIG. 6D, the dummy magnetized patterns 65 are not detected by the magnetic head for reproduction, and the waveform is a waveform 68, which represents no signal. The dummy magnetized patterns 65 are not detected by the magnetic head for reproduction. Therefore, they are not recognized as reproduction signals.

When magnetic transfer is performed by using the master information carrier according to the second embodiment and the third embodiment of the present invention, the dummy magnetized patterns of the slave medium after magnetic transfer are not detected by the magnetic head for reproduction. Therefore, the dummy magnetized patterns are not recognized as reproduction signals at the drive. Meanwhile, since the dummy uneven patterns are provided, production of an unclear magnetized area can be suppressed during magnetic transfer. Accordingly, it is possible to prevent incorrect recognition due to generation of sub-pulses.

Figures 7A, 7B:
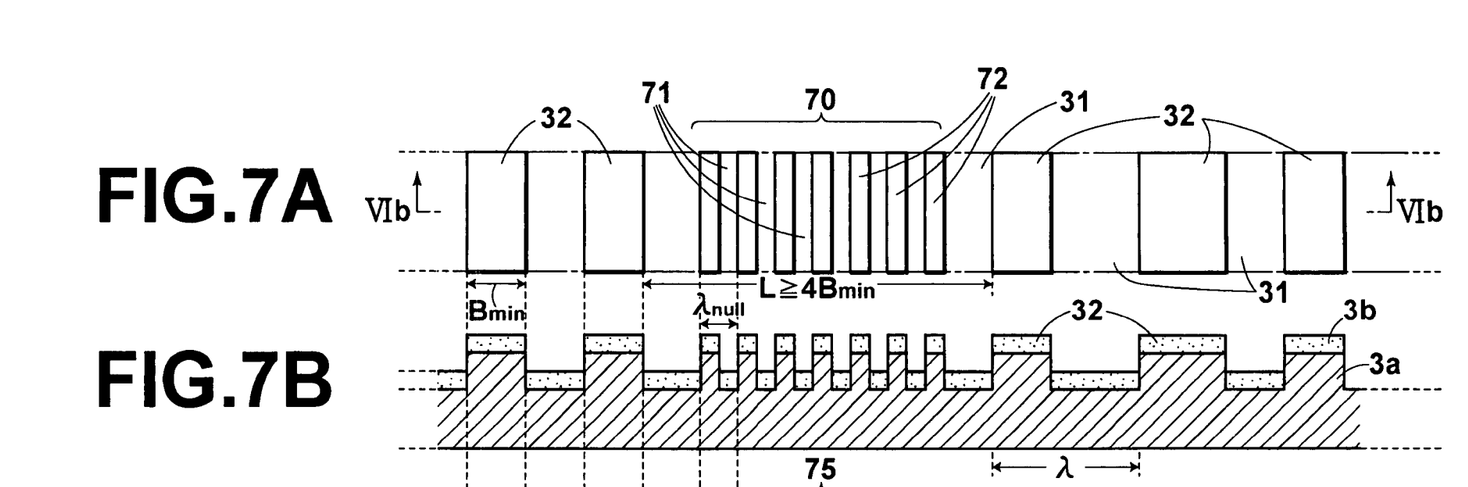
FIG. 7A is a plan view illustrating a part of a track on a master information carrier according to a fourth embodiment of the present invention.
FIG. 7B is a sectional view illustrating a part of the master information carrier.
Figure 7C:
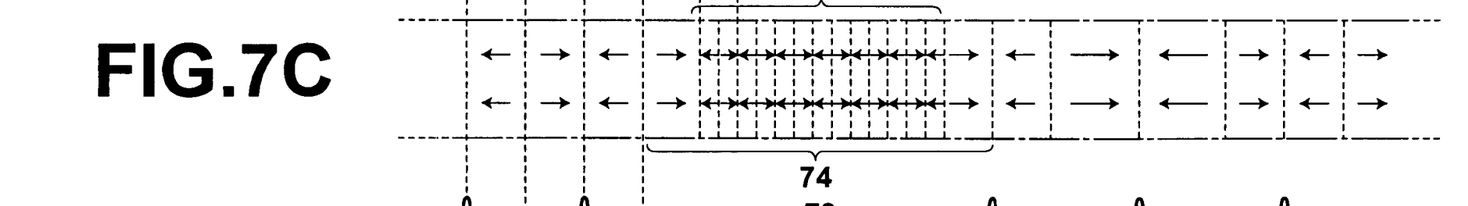
FIG. 7C is a schematic view illustrating magnetized patterns on a slave medium.
Figure 7D:
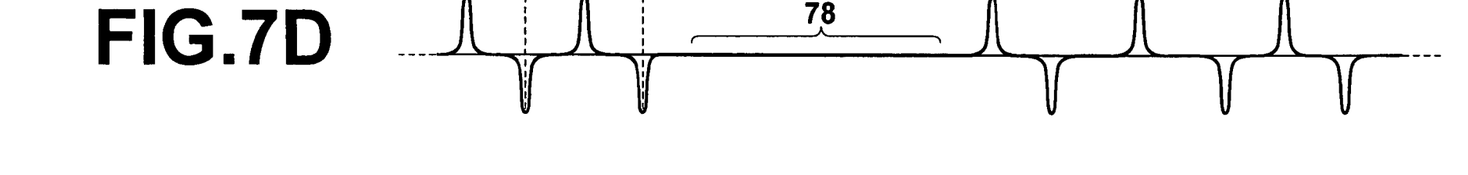
FIG. 7D is a schematic view illustrating a reproduced waveform.

FIG. 7A is a plan view illustrating a part of a track on a master information carrier according to a fourth embodiment of the present invention. FIG. 7B is a sectional view taken along line VIb-VIb of FIG. 7A. FIG. 7C is a schematic plan view illustrating magnetized patterns, which are provided on the slave medium by magnetically transferring information from the part of the master information carrier, illustrated in FIG. 7A, onto the salve medium. FIG. 7D is a schematic view illustrating a waveform, which is detected, by the magnetic head for reproduction, from the magnetized patterns, illustrated in FIG. 7C.

In the master information carrier according to the present embodiment, dummy uneven patterns 70 are formed in a cycle corresponding to a null gap length. Specifically, depressions 71 and protrusion 72 are formed so that the ratio between the depression area and the protrusion area in a cycle λnull is 1:1 in the direction along the track.

The value of λnull is within the range of 0.99MRG to 1.13MRG, which is the range of the null gap length Lnull when a reproduction gap length of the magnetic head for reproduction in the drive, into which the slave medium after magnetic transfer will be loaded, is MRG (μm).

As illustrated in FIG. 7C, when magnetic transfer is performed by using the master information carrier according to the present embodiment, magnetized signal patterns corresponding to the uneven signal patterns are transferred onto the recording surface of the slave medium. At the same time, dummy magnetized patterns 75 corresponding to the dummy uneven patterns 70 are transferred onto a unidirectionally magnetized area 74 in the magnetized signal patterns. In the dummy magnetized patterns 75, the ratio between the area, which is magnetized to the right in FIG. 7C, and the area, which is magnetized to the left in FIG. 7C, in the cycle λnull in the direction along the track is approximately 1:1.

As illustrated in FIG. 7D, the dummy magnetized patterns 75 are not detected by the magnetic head for reproduction. Therefore, the waveform of the dummy magnetized patterns 75 is a waveform 78, which represents no signal. Since the dummy magnetized patterns 75 are not detected by the magnetic head for reproduction, the dummy magnetized patterns 75 are not recognized as reproduction signals.

As described above, when magnetic transfer is performed by using the master information carrier according to the fourth embodiment, the dummy magnetized patterns of the slave medium after magnetic transfer are not detected by the magnetic head for reproduction. Therefore, the dummy magnetized patterns are not recognized as reproduction signals at the drive. However, since the dummy uneven patterns are provided, production of an unclear magnetized area during magnetic transfer can be suppressed. Accordingly, incorrect recognition due to sub-pulses can be prevented.

What is claimed is:

1. A master information carrier for magnetically transferring desired information onto a slave medium, the master information carrier for magnetic transfer comprising:
uneven signal patterns corresponding to the desired information, which are formed along a track, wherein when a minimum bit length in the uneven signal patterns is $B_{min}$, dummy uneven patterns, which are different from the uneven signal patterns, are formed in a depression of the uneven signal patterns, which has a length of $4B_{min}$ or longer in the direction along the track,
wherein the dummy uneven patterns are patterns for transferring magnetized patterns, which will be detected by a magnetic head for reproduction in a drive, into which the slave medium after magnetic transfer will be loaded, but which will not be recognized as reproduction signals at the drive.

2. A master information carrier for magnetic transfer, as defined in claim 1, wherein the dummy uneven patterns include protrusions and depressions, which are formed along the track in a cycle different from a formation cycle of the uneven signal patterns.

3. A method of magnetic transfer, comprising the steps of:
placing a master information carrier for magnetic transfer as defined in claim 2 into close contact with a slave medium; and
applying a magnetic field for transfer onto the conjoined body formed by the master information carrier and the slave medium, thereby transferring magnetized patterns based on transfer patterns borne on the master information carrier onto the slave medium.

4. A master information carrier for magnetic transfer, as defined in claim 1, wherein the dummy uneven patterns include protrusions and depressions, which are randomly arranged with respect to both the direction along the track and the width direction of the track.

5. A method of magnetic transfer, comprising the steps of:
placing a master information carrier for magnetic transfer as defined in claim 4 into close contact with a slave medium; and
applying a magnetic field for transfer onto the conjoined body formed by the master information carrier and the slave medium, thereby transferring magnetized patterns based on transfer patterns borne on the master information carrier onto the slave medium.

6. A method of magnetic transfer, comprising the steps of:
placing a master information carrier for magnetic transfer as defined in claim 1 into close contact with a slave medium; and
applying a magnetic field for transfer onto the conjoined body formed by the master information carrier and the slave medium, thereby transferring magnetized patterns based on transfer patterns borne on the master information carrier onto the slave medium.

7. A master information carrier for magnetic transfer, as defined in claim 1, wherein a magnetization direction of the uneven signal patterns and the dummy uneven patterns is the same.

8. A master information carrier for magnetic transfer, as defined in claim 1, wherein the reproduction signal recognized by the drive is a signal of a predetermined frequency range and a predetermined amplitude.

9. A master information carrier for magnetically transferring desired information onto a slave medium, the master information carrier for magnetic transfer comprising:
uneven signal patterns corresponding to the desired information, which are formed along a track, wherein when a minimum bit length in the uneven signal patterns is $B_{min}$, dummy uneven patterns, which are different from the uneven signal patterns, are formed in a depression of the uneven signal patterns, which has a length of $4B_{min}$ or longer in the direction along the track,
wherein the dummy uneven patterns are patterns for transferring magnetized patterns, which will not be detected by a magnetic head for reproduction in a drive, into which the slave medium after magnetic transfer will be loaded.

10. A master information carrier for magnetic transfer, as defined in claim 9, wherein the dummy uneven patterns are formed in the track so that the ratio between a depression area and a protrusion area in the width direction of the track is approximately 1:1.

11. A master information carrier for magnetic transfer, as defined in claim 10, wherein the dummy uneven patterns include protrusions and depressions, which are formed in a cycle, obtained by multiplying the width (W) of the track with the reciprocal of an even number.

12. A master information carrier for magnetic transfer, as defined in claim 10, wherein the dummy uneven patterns include protrusions and depressions, which are formed at an angle of 30 degrees or more with respect to the width direction of the track.

13. A master information carrier for magnetic transfer, as defined in claim 9, wherein the dummy uneven patterns include protrusions and depressions, which are formed in a cycle corresponding to the null gap length of the magnetic head for reproduction.

14. A method of magnetic transfer, comprising the steps of:
  placing a master information carrier for magnetic transfer as defined in claim 9 into close contact with a slave medium; and
  applying a magnetic field for transfer onto the conjoined body formed by the master information carrier and the slave medium, thereby transferring magnetized patterns based on transfer patterns borne on the master information carrier onto the slave medium.

15. A magnetic recording medium, wherein magnetized signal patterns corresponding to desired information are recorded along a track, wherein when a minimum bit length in the magnetized signal patterns is $B_{min}$, dummy magnetized patterns, which are different from the magnetized signal patterns, are formed in a unidirectionally magnetized area having a length of $4B_{min}$ or longer in the direction along the track in the magnetized signal patterns,
  wherein the dummy magnetized patterns are magnetized patterns, which will be detected by a magnetic head for reproduction in a drive, but which will not be recognized as reproduction signals at the drive.

16. A magnetic recording medium as defined in claim 15, wherein the dummy magnetized patterns are magnetized patterns, which will not be detected by a magnetic head for reproduction in a drive.

* * * * *